United States Patent
Jose et al.

(10) Patent No.: US 9,813,863 B2
(45) Date of Patent: Nov. 7, 2017

(54) ENHANCED PASSIVE POSITIONING WITH ADAPTIVE ACTIVE POSITIONING

(71) Applicant: QUALCOMM Incorporated, San Diego, CA (US)

(72) Inventors: Jubin Jose, Bound Brook, NJ (US); Xinzhou Wu, Hillsborough, NJ (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/820,437

(22) Filed: Aug. 6, 2015

(65) Prior Publication Data
US 2017/0041750 A1 Feb. 9, 2017

(51) Int. Cl.
| | |
|---|---|
| H04W 24/00 | (2009.01) |
| H04W 4/02 | (2009.01) |
| G01S 5/02 | (2010.01) |
| G01S 5/10 | (2006.01) |
| H04L 12/841 | (2013.01) |
| H04W 24/08 | (2009.01) |

(52) U.S. Cl.
CPC .......... *H04W 4/023* (2013.01); *G01S 5/0263* (2013.01); *G01S 5/10* (2013.01); *H04L 47/283* (2013.01); *H04W 24/08* (2013.01)

(58) Field of Classification Search
CPC .................................................. H04W 4/023
USPC ....................................................... 455/456.1
See application file for complete search history.

(56) References Cited

U.S. PATENT DOCUMENTS

| | | | |
|---|---|---|---|
| 5,420,592 A | * | 5/1995 | Johnson .................. G01S 11/10 342/357.46 |
| 8,164,514 B1 | | 4/2012 | Yang et al. |
| 2010/0144373 A1 | | 6/2010 | Goldfarb et al. |
| 2010/0240389 A1 | * | 9/2010 | Harper ................ H04W 36/385 455/456.1 |
| 2011/0090122 A1 | | 4/2011 | Thomson et al. |
| 2011/0105149 A1 | | 5/2011 | Riley et al. |
| 2013/0337847 A1 | | 12/2013 | Sridhara et al. |
| 2014/0329538 A1 | | 11/2014 | Zhang et al. |
| 2015/0105098 A1 | | 4/2015 | Sridhara et al. |
| 2015/0351071 A1 | * | 12/2015 | Pandey ............... H04W 64/003 455/456.1 |

FOREIGN PATENT DOCUMENTS

| | | |
|---|---|---|
| DE | 102008026274 A1 | 12/2009 |
| JP | 2009085780 A | 4/2009 |

OTHER PUBLICATIONS

Panichcharoenrat T., et al., "Hybrid Location Awareness in Cognitive Radio System," Proceedings of the International Electrical Engineering Congress, 2014, 4 pages.
International Search Report and Written Opinion—PCT/US2016/041205—ISA/EPO—dated Oct. 18, 2016.

* cited by examiner

*Primary Examiner* — Charles Shedrick
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations and/or techniques for enhanced passive positioning with adaptive round trip time (RTT)-type ranging, such as for use in or with a mobile communication device, for example.

30 Claims, 5 Drawing Sheets

ENHANCED PASSIVE POSITIONING WITH ADAPTIVE ACTIVE POSITIONING

BACKGROUND

1. Field

The present disclosure relates generally to position or location estimations of mobile communication devices and, more particularly, to enhanced passive positioning with adaptive active positioning for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor environment, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as access points, for example, positioned at known locations. Ranges may be measured, for example, by obtaining a Media Access Control identifier (MAC ID) address from wireless signals received from suitable access points and measuring one or more characteristics of received signals, such as signal strength, round trip delay, or the like. In some instances, however, for more accurate positioning, time synchronization between transmitter devices and/or mobile communication devices may be needed or otherwise useful. At times, positioning accuracy may also be affected by a spatial layout or geometry of locations of terrestrial transmitter devices relative to a location of a mobile communication device, for example.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
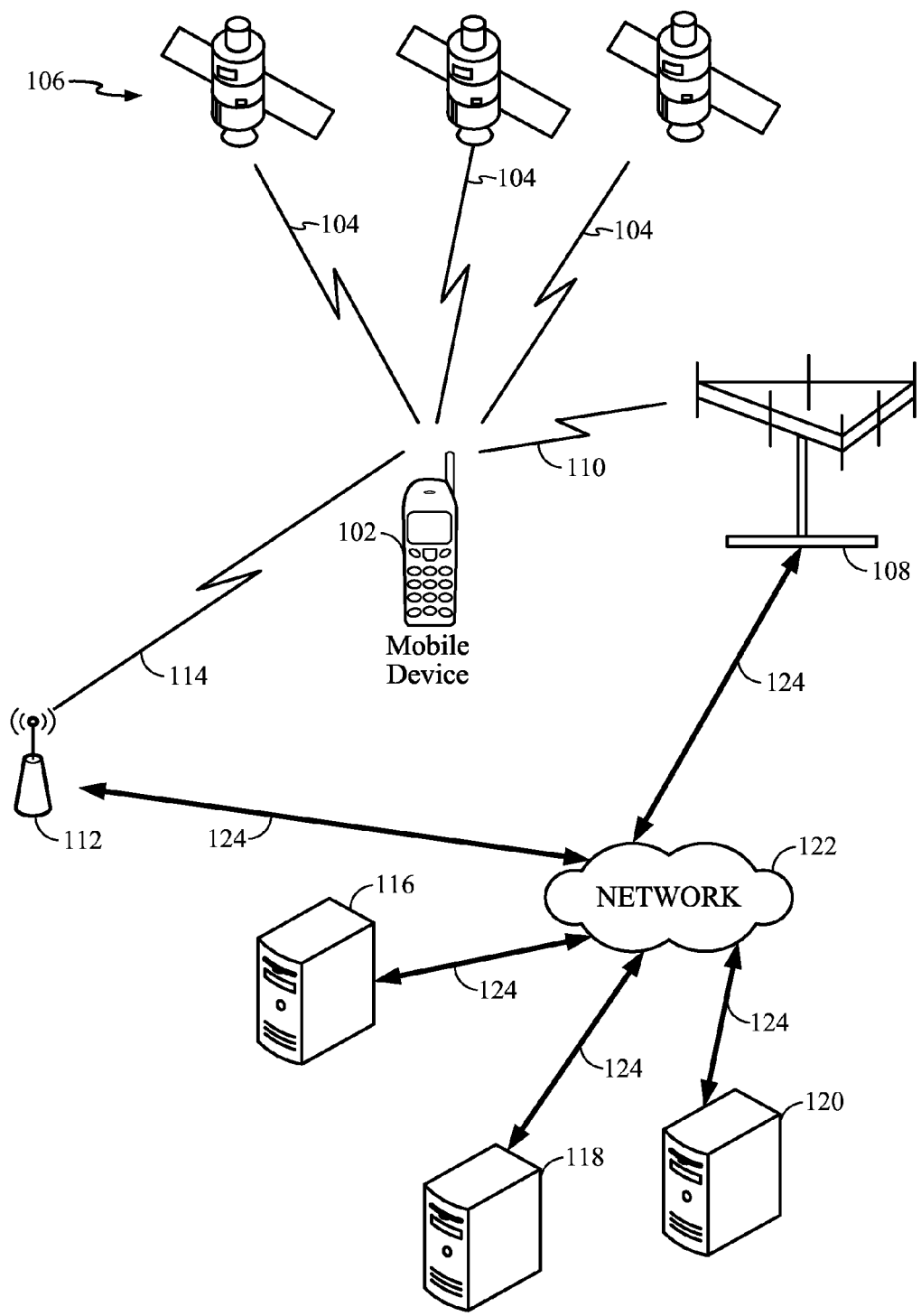
FIG. 1 is a schematic diagram illustrating features associated with an implementation of an example operating environment.

Example implementations relate to techniques for enhanced passive positioning with adaptive active positioning. In one implementation, a method may comprise obtaining, at a mobile device, passive measurements of signals transmitted from terrestrial transmitters; obtaining a first estimated location of the mobile device based, at least in part, on the passive measurements; and initiating active measurements for obtaining a second estimated location of the mobile device in response to determining that the first estimated location is not of sufficient quality based, at least in part, on the first estimated location and a spatial configuration of the terrestrial transmitters.

In another implementation, an apparatus may comprise means for obtaining passive measurements of signals transmitted from terrestrial transmitters; means for obtaining a first estimated location of a mobile device based, at least in part, on the passive measurements; and means for initiating active measurements for obtaining a second estimated location of the mobile device in response to determining that the first estimated location is not of sufficient quality based, at least in part, on the first estimated location and a spatial configuration of the terrestrial transmitters.

In yet another implementation, an apparatus may comprise a mobile device comprising a wireless transceiver to communicate with an electronic communications network to obtain passive measurements of signals transmitted from terrestrial transmitters; and one or more processors coupled to a memory to: obtain a first estimated location of the mobile device based, at least in part, on the passive measurements; and initiate active measurements to obtain a second estimated location of the mobile device in response to a determination that the first estimated location is not of sufficient quality based, at least in part, on the first estimated location and a spatial configuration of the terrestrial transmitters.

In yet another implementation, an article may comprise a non-transitory storage medium having instructions executable by a processor to obtain passive measurements of signals transmitted from terrestrial transmitters; obtain a first estimated location of a mobile device based, at least in part, on the passive measurements; and initiate active measurements to obtain a second estimated location of the mobile device in response to a determination that the first estimated location is not of sufficient quality based, at least in part, on the first estimated location and a spatial configuration of the terrestrial transmitters. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations and/or techniques for enhanced passive positioning with adaptive active positioning for use in or with mobile communication devices. As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for enhanced passive positioning with adaptive active positioning, and that claimed subject matter is not limited in this regard. It should also be noted that the terms "position" and "location" may be used interchangeably herein.

As alluded to previously, in an indoor environment or like partially or substantially enclosed areas (e.g., urban canyons, etc.), certain mobile devices may be unable to reliably receive or acquire satellite or like wireless signals to facilitate or support one or more position estimation techniques. As such, different techniques may be employed to enable indoor navigation or location services. For example, an indoor position fix of a mobile device, such as a cellular telephone, may be obtained based, at least in part, on information gathered from various systems. One such system may comprise, for example, a wireless local access network (WLAN) communication system having a number of wireless transmitters, such as IEEE 802.11 std. WLAN access points supporting communications for a number of proximate mobile devices. Here, to obtain a position fix, a mobile device may, for example, measure ranges to three or more terrestrial WLAN access points positioned at known locations. Ranges may be measured, for example, by obtaining a Media Access Control (MAC) address from known WLAN access points and measuring one or more signal characteristics indicative of received signal strength (e.g., received signal strength indicator (RSSI), etc.), round-trip delay times (e.g., RTT, etc.), or the like. Based, at least in part, on measured ranges, a mobile device may, for example, estimate its location by applying one or more suitable positioning techniques, such as trilateration, triangulation, etc., just to illustrate a few possible implementations.

Over time, recorded RSSI values within an indoor or like environment may vary, however, even if there are no or little changes to an associated propagation space. Since RSSI values may be prone to environmental interference, such as multipath fading and/or shadowing effects, for example, at times, path loss-related positioning may be less accurate or useful. In addition, parameters employed in these models are typically site-specific and/or nonlinear. As compared to RSSI, thus, in some instances, time of flight-related localization utilizing, for example, RTT, time of arrival (TOA), time difference of arrival (TDOA), etc., angulation-related localization utilizing, for example angle of arrival (AOA) or like measurements may prove beneficial since its measurement results may scale linearly with open-air propagation distances. A mobile device may, for example, measure a range to a wireless transmitter, such as a WLAN access point based, at least in part, on a TOA of a beacon signal broadcasted by the access point relative to some synchronized timing reference. A TOA beacon may, for example, be broadcasted periodically by an access point to announce its presence in an area, relay information, such as signal-related identifiers having a timestamp with a time at which the beacon was sent, service set identification (SSID) of an associated wireless network, or other network and/or access point-related information. Unfortunately, clocks of wireless transmitters and target mobile devices are typically not synchronized, meaning that a first clock state maintained at a wireless transmitter and a second clock state maintained at a mobile device may differ by an unknown bias. As such, it may be difficult or, at times, impossible for a mobile device to estimate its range to a proximate wireless transmitter with sufficient accuracy, such as to facilitate or support a requisite positioning operation, for example, based, at least in part on a TOA measurement in a broadcasted beacon signal.

To at least partially address synchronization or related issues, at times, a double difference of TOA technique, such as via transmitting TOA beacons from at least two transmitters, such as WLAN access points, for example, to at least two receivers, such as, for example, a mobile device and a master access point may be used, at least in part. In this context, a "master access point" refers to a wireless transmitter, WLAN or otherwise, capable of coordinating and/or managing information exchange within a wireless network, such as via network-related infrastructure (e.g., other access points, applicable servers, etc.). For example, a master access point, such as a WLAN access point, as one example, may comprise a master node within a wireless network or like infrastructure that may control access to the network, query other access points on the network, such as for purposes of initiating and/or scheduling TOA beacons, RTT or like exchanges, etc., may determine and/or allocate channel priority, coordinate associated wireless traffic, assist in clock synchronization, network load balancing, or the like. In some instances, a master access point may have an expanded capability and/or be more efficient than other wireless transmitters on a network, such as, for example, have a higher throughput ratio, peak bit rate, memory, processing resources, or the like, just to illustrate one possible implementation. At times, a master access point may be simply designated as such, meaning that it may have the same or similar capabilities as other wireless transmitters on a network. Of course, these are merely examples relating to a master access point, and claimed subject matter is not limited in this regard. It should be noted that, in this context, a wireless transmitter may typically comprise a device capable of transmitting as well as receiving wireless signals. It should also be appreciated that even though references to an "access point" are made throughout the present specification, such as for ease of discussion, any suitable wireless transmitter and/or receiver, WLAN or otherwise, may be employed herein, in whole or in part.

As used herein, a "double difference of TOA technique" refers to a positioning technique that may be implemented via transmitting TOA beacons from at least two transmitters to at least two receivers and measuring respective arrival times of a transmitted wireless signal. For example, while implementing a double difference of TOA technique, a master access point may query or communicate with a number of access points on a network, such as to elicit broadcasts of TOA beacons, for example. Subsequently, with respect to each participating access point, a mobile device may, for example, determine a TOA of a received beacon using its own internal clock, and a master access point may make a similar determination using its own clock. A master access point may, for example, record and/or store in some manner (e.g., in local memory, on a server, etc.) travel times or like TOA measurements of respective received beacons frames with reference to each broadcasted access point (e.g., a MAC address, location, etc.), and may communicate this or like data to associated mobile devices via a positioning assistance message. With knowledge of access point locations, such as via applicable identifiers, for example, and using cross-correlation between TOA beacons received at a mobile device and a master access point, appropriate ranges may be computed, and a location of a mobile device may be estimated. For example, a location of a mobile device may be estimated, such as accounting for synchronization or related issues, at least in part, via integrating a lag product of two received TOA beacons (e.g., at a mobile device and a master access point, etc.) over their recorded travel times, just to illustrate one possible implementation. These or like techniques are generally known and need not be described here in greater detail.

In some instances, such as to at least partially reduce and/or eliminate a requirement of initial and/or more precise clock synchronization, for example, a measured RTT of a suitable message exchange may be utilized, at least in part, to determine a range between a mobile device and a wireless transmitter, such as a WLAN access point. For example, at times, a suitable message exchange may comprise a fine timing measurement (FTM) and fine timing measurement request (FTMR) message exchange (an FTM/FTMR message exchange), such as implemented in connection with the IEEE 802.11v std. or like ranging protocol, for example. Briefly, for purposes of explanation, here, a mobile device may transmit an FTM request to a proximate wireless transmitter, which may generate and transmit a response message, such as via an FTM acknowledgement (ACK) or other frame, for example. A mobile device and a wireless transmitter may exchange a number of subsequent FTM frames and responses to the FTM frames/acknowledgements (ACKs), such as to record and share respective measurements of transmission and arrival times (e.g., respective times of departure (TOD), times of arrival (TOA), etc. of FTM frames). For example, a wireless transmitter may transmit to a mobile device via an FTM frame (e.g., in a payload, etc.) a TOD measurement recorded (e.g., via a time stamp, etc.) at time t1 and a TOA measurement recorded at time t4, such as after transmitting a response to an FTMR to the mobile device and in response to an ACK message subsequently received from the mobile device. Here, a mobile device may record a TOA of the above response to the FTMR, such as with reference to reception time t2, for example, and may record a TOD of the above ACK message, such as with reference to transmission time t3. Thus, with knowledge of transmission and reception times t1, t2, t3, and t4, a mobile device may estimate an RTT to an applicable wireless transmitter as, for example, RTT=(t4−t1)−(t3−t2).

It should be noted that claimed subject matter is not limited to a particular standard, ranging protocol, type of wireless signals and/or frames, etc., such as, for example, to obtain an RTT measurement and/or determine a range between a mobile device and an applicable wireless transmitter. For example, in some instances, an FTM/FTMR message exchange may include transmitting and/or receiving beacons or like signals (e.g., modified beacons, etc.), null data packets (NDPs), or other types of frames comprising FTM/FTMR-related data (e.g., time stamps, TOA, TODs, etc.). In some instances, a range between a mobile device and an applicable wireless transmitter may, for example, be determined, at least in part, via a request-to-send/clear-to-send (RTS/CTS) message exchange. For example, a mobile device may determine a range by measuring a signal RTT to an access point by broadcasting one or more IEEE 802.11 std. probe requests (e.g., via an RTS data frame, etc.) and measuring a time until receipt of a response message (e.g., via a CTS data frame, etc.). Other suitable techniques or approaches, such as to obtain an RTT measurement and/or determine a range between a mobile device and an applicable wireless transmitter, for example, may also be utilized herein, in whole or in part.

Continuing with the above discussion, in denser operating environments, however, such as where there are multiple mobile devices receiving service from the same access points, for example, FTM/FTMR message exchanges may consume uplink and/or downlink resources that may be otherwise employed by or for other services (e.g., Internet Protocol (IP) services, etc.). In addition, to facilitate or support RTT measurements, network resources (e.g., particular access points, etc.), such as to perform a requisite number of FTM/FTMR message exchanges, for example, may need to be specifically allocated. This may be operationally expensive, may result in positioning latencies, or the like. Also, since active measurements may typically require a two-way communication, such as between at least two wireless devices, for example, they may also negatively affect bandwidth, network-related or otherwise.

Accordingly, passive positioning, such as using TOA, TDOA, AOA, or like measurements, for example, thus, may prove beneficial in terms of lowering network and/or mobile device power, improving bandwidth consumption, etc. due, at least in part, to passive scanning, for example, and/or in terms of network scalability due, at least in part, to a typically fixed network-related resource allocation regardless of a number of participating devices. For example, as is generally known, since passive scanning techniques typically involve measuring one or more signals received from another wireless device, at times, passive positioning may be preferable since it may have a lesser impact on bandwidth. As mentioned above, at times, TOA-related or like positioning may require more precise time synchronization (e.g., known clock bias) between access points and/or mobile devices, however. With respect to RTT-related positioning, as was also indicated, more precise time synchronization may not be needed or useful, but FTM/FTMR message exchanges or like communications (e.g., RTS/CTS message exchanges, etc.) may, for example, result in higher network-related power and/or bandwidth consumption due, at least in part, to active scanning. Active and/or passive scanning techniques, such as to detect in-range wireless transmitters, for example, are generally known and need not be described here in greater detail. Accordingly, it may be desirable to develop one or more methods, systems, or apparatuses that may implement more enhanced positioning, such as via adaptively combining measurements obtained from passive scanning, for example, with one or more selective RTT or like range-related measurements.

Thus, as will be discussed in greater detail below, an initial position fix of a mobile device may, for example, be roughly or coarsely estimated based, at least in part, on one or more measurements obtained from one or more passive scanning techniques, such as using TOA beacons, RSSI, AOA, or like measurements. At times, at or after obtaining an initial position fix, a quality of the position fix may also be determined using one or more appropriate techniques. For example, here, horizontal dilution of precision (HDOP), computing a residual position error, finding a convex hull formed by locations of access points from which passive measurements were obtained, or like techniques may be used, at least in part, or otherwise considered. In some instances, such as if it is determined that an initial position fix is not sufficiently reliable and/or accurate, for example, a mobile device may initiate a transmission of a message to one or more proximate wireless transmitters (e.g., WLAN access points, etc.), such as via FTM/FTMR data frames discussed above, as one example, to compute requisite ranges via corresponding RTT measurements. Based, at least in part, on computed ranges, a coarse position fix on a mobile device may be updated or refined. It should be noted that, at times, a double difference of TOA technique, such as discussed above, may also be used, at least in part, or otherwise considered, such as in addition to or in combination with RTT measurements, for example, to update or refine a coarse position fix of a mobile device, as will also be seen.

FIG. 1 is a schematic diagram illustrating features associated with an implementation of an example operating environment 100 capable of facilitating or supporting one or more processes or operations for enhanced passive positioning with adaptive active positioning for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances local transceiver 112 may comprise, for example, a wireless transmitter or receiver capable of transmitting or receiving wireless signals.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). As was indicated, at times, an indoor or like environment associated with local transceiver 112 may comprise, for example, a denser environment where multiple mobile devices receive service from local transceiver 112, which may consume uplink and/or downlink resources, create or contribute to wireless traffic congestion, tax available bandwidth, or the like. In an implementation, local transceiver 112 may comprise, for example, a master access point capable of coordinating and/or managing information exchange between devices associated with operating environment 100, such as mobile device 102, base station transceiver 108, or the like. In another example implementation, local transceiver 112 may comprise a femtocell capable of facilitating communication via link 114 according to an applicable cellular or like wireless communication protocol. Of course, it should be understood that these are merely examples of devices that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate or support mobile cellular communication with mobile device 102. As discussed below, in some instances, network 122 may facilitate or support one or more passive and/or active scanning techniques, such as via RTT, TOA, TDOA, RSSI, AOA, or like measurements, for example. Servers 116, 118, and/or 120 may comprise any suitable servers or combination thereof capable of facilitating or supporting one or more operations or techniques discussed herein. For example, servers 116, 118, or 120 may comprise one or more positioning assistance servers, navigation servers, map servers, crowdsourcing servers, network-related servers, or the like.

In particular implementations, and as also discussed below, mobile device 102 may have circuitry or processing resources capable of computing a position fix or estimated location of mobile device 102, initial or otherwise. For example, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix, initial or otherwise, by processing wireless signals received from one or more terrestrial transmitters positioned at known locations (e.g., base station transceiver 108, local transceiver 112, etc.) using any one of several techniques, such as, for example, AFLT, observed time difference of arrival (OTDOA), or the like. In these techniques, a range from mobile device 102 may, for example, be measured to three or more of terrestrial transmitters based, at least in part, on one or more reference signals transmitted by these transmitters and received at mobile device 102, as was indicated. In some instances, mobile device 102 may obtain a position fix, initial or otherwise, by performing a double difference of TOA technique, such as discussed above, for example. At times, mobile device 102 may be capable of computing a position fix, initial or otherwise, based, at least in part, on requisite ranges obtained from RTT measurements of FTM/FTMR, RTS/CTS, or like message exchanges, as was also indicated. At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

In an implementation, mobile device 102 may, for example, receive positioning assistance data for one or more positioning operations from servers 116, 118, or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, AOA, RSSI, TDOA, etc., or any combination thereof. In some instances, positioning assistance data to aid positioning operations may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, configuration of wireless transmitters, or the like. The terms "positioning assistance data" and "navigation assistance data" may be used interchangeably herein.

According to an implementation, mobile device 102 may access indoor navigation assistance data via servers 116, 118, or 120 by, for example, requesting such data through selection of a universal resource locator (URL). In particular implementations, servers 116, 118, or 120 may be capable of providing indoor navigation assistance data to cover many different indoor areas including, for example, floors of buildings, wings of hospitals, terminals at an airport, portions of a university campus, areas of a large shopping mall, just to name a few examples. Also, if memory or data transmission resources at mobile device 102 make receipt of indoor positioning assistance data for all areas served by servers 116, 118, or 120 impractical or infeasible, a request for such data from mobile device 102 may, for example, indicate a rough or course estimate of a location of mobile device 102 (e.g., obtained via a double difference of TOA technique, etc.). Mobile device 102 may then be provided indoor navigation assistance data covering, for example, one or more areas including or proximate to a roughly estimated location of mobile device 102. In some instances, one or more servers 116, 118, or 120 may facilitate or support computing a quality of an initial position estimate of mobile device 102, such as, for example, via computing horizontal dilution of precision (HDOP), determining a residual position error, finding a convex hull formed by locations of access points from which passive measurements were obtained, or the like, as discussed below.

Even though a certain number of computing platforms or devices are illustrated herein, any number of suitable computing platforms or devices may be implemented to facilitate or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate or support femtocell-based operative regions of coverage, for example. Again, these are merely example implementations, and claimed subject matter is not limited in this regard.

Figure 2:
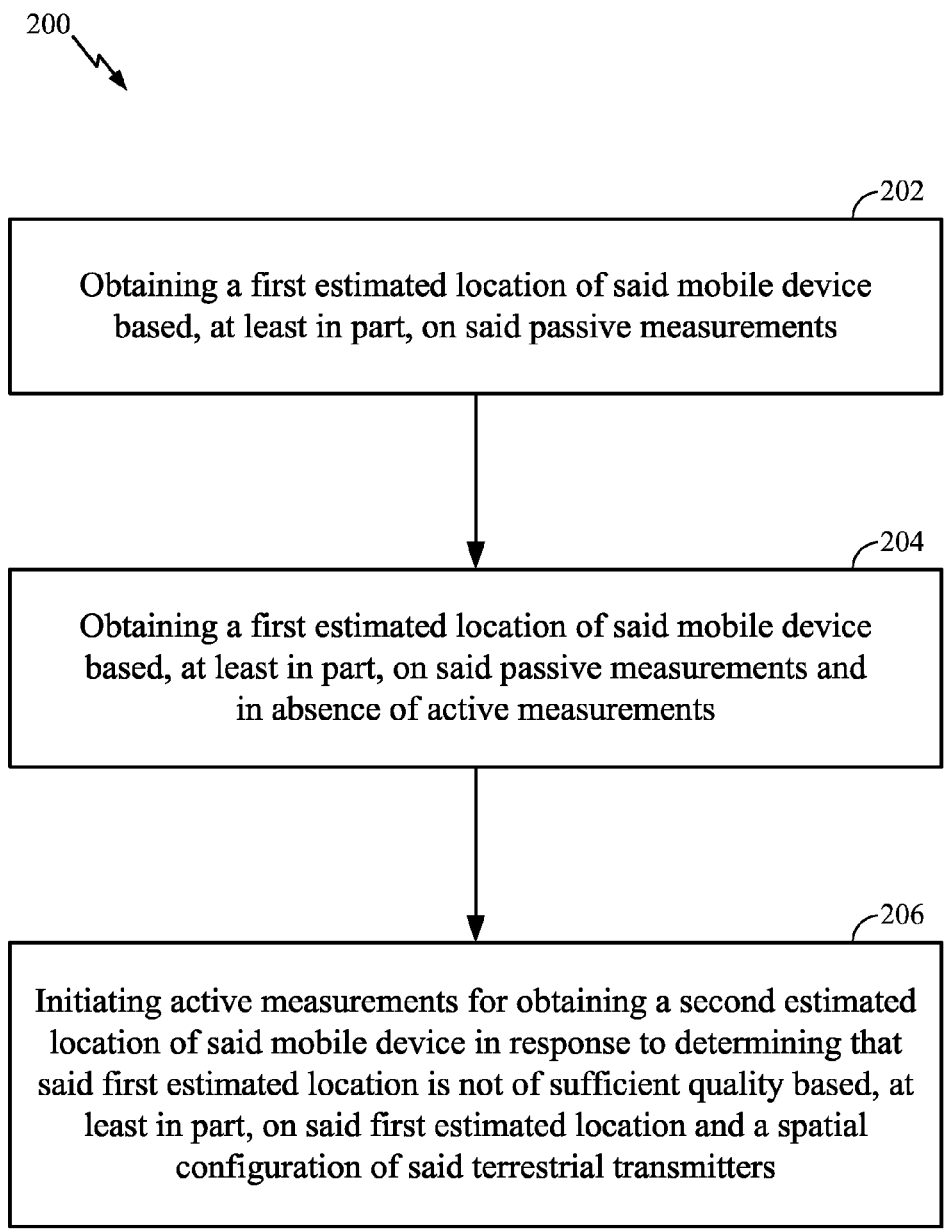
FIG. 2 is a flow diagram illustrating an implementation of an example process that may be performed to facilitate and/or support enhanced passive positioning with adaptive active positioning.

With this in mind, attention is now drawn to FIG. 2, which is a flow diagram illustrating an implementation of an example process 200 that may be performed, in whole or in part, to facilitate or support one or more operations and/or techniques for enhanced passive positioning with adaptive active positioning for use in or with a location-aware mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with obtaining, at a mobile device, passive measurements of signals transmitted from terrestrial transmitters. As was indicated, in this context, "passive measurements" refer to one or more measurements obtained via one or more passive scanning techniques. For example, depending on an implementation, passive measurements may comprise one or more TOA, TDOA, RSSI, AOA, or like measurements, such as observed or obtained at a received of a mobile device or like measuring unit. Claimed subject matter is not so limited, of course. In some instances, passive measurements may also comprise or be part of, for example, a positioning assistance message having one or more applicable or suitable measurements or characteristics of a broadcasted or communicated signal that may be used, at least in part, for localization. A "scan," as used herein, typically refers to a technique implemented to acquire signals transmitted by proximate or "visible" wireless transmitters and/or detect particular parameters encoded in the acquired signals (e.g., unique identifiers, locations, etc.). As a way of illustration, an active scan may, for example, be performed via transmitting one or more requests, such as in the form of one or more unicast packets, for example, and receiving one or more responses, and a passive scan may be performed by "listening" for wireless signals broadcasted by proximate wireless transmitters, for example. Again, scanning techniques are generally known and need not be described here in greater detail. As was also discussed, terrestrial transmitters may comprise any suitable wireless transmitters capable of transmitting and/or receiving wireless signals, such as, for example, one or more IEEE 802.11 std. WLAN access points, base transceiver stations, femtocells, radio beacons, mobile devices with known locations, or the like.

With regard to operation 204, a first estimated location of the mobile device may, for example, be obtained based, at least in part, on the passive measurements and in absence of active measurements. For example, here, rather than "actively" measure one or more RTTs, such as via an FTM/FTMR message exchange, as one example, a mobile device may passively "listen" to one or more beacon signals broadcasted by one or more proximate wireless transmitters, such as WLAN access points, and may measure TOAs of the broadcasted signals. Based, at least in part, on one or more measured TOAs, requisite ranges to proximate wireless transmitters may be computed, for example, and a first estimated location of a mobile device may be obtained, such as using one or more appropriate techniques (e.g., trilateration, triangulation, etc.). As was indicated, in some instances, to obtain a first estimated location while at least partially addressing synchronization or related issues, a double difference of TOA technique may, for example, be used, at least in part, or otherwise considered. Claimed subject matter is not so limited, of course. For example, at times, a first estimated location of a mobile device may be obtained, at least in part, via a GNSS, GNSS pseudolites, input provided by an associated user, radio heat map, or the like. In some instances, a first estimated location of a mobile device may, for example, be determined using a proximity to one or more reference points, such as by knowing which wireless transmitter a mobile device is using at a given time. At times, a first estimated location of a mobile device may, for example, be determined via dead reckoning. For example, here, one or more on-board sensors (e.g., inertial, etc.) may be employed to approximate a current position based, at least in part, on a last known position fix, and incrementing that position fix using a known direction of travel and/or estimated speed over some elapsed time. As previously mentioned, in some instances, a first estimated location of a mobile device may comprise or otherwise be treated as, for example, an initial or "coarse" location estimate, which may be subsequently updated or refined, such as if it is determined that such an estimate is not of sufficient quality, as discussed below.

Thus, at operation 206, active measurements for obtaining a second estimated location of the mobile device may, for example, be initiated, such as in response to determining that the first estimated location is not of sufficient quality based, at least in part, on the first estimated location and a spatial configuration of the terrestrial transmitters. In this context, "active measurements" refer to one or more measurements obtained via a communication between two or more wireless devices, such as a two-way "request-response"-type communication implemented in connection with one or more active scanning techniques. For example, depending on an implementation, active measurements may comprise one or more RTT measurements, such as observed or obtained at a received of a mobile device or like measuring unit. Again, claimed subject matter is not so limited. Namely, even though RTT measurements are discussed herein, such as obtained via active scanning using radio signals of an FTM/FTMR message exchange, for example, any other suitable RTT measurements, such as using RTS/CTS, ultrasound, infrared, or like signals may be employed, in whole or in part. At times, active measurements may also comprise or be part of, for example, a positioning assistance message having one or more applicable or suitable measurements or characteristics of a returned signal that may be used, at least in part, for localization.

Thus, according to an implementation, a quality of an initial or "coarse" position fix, such as a first estimated location obtained in connection with operation 204, for example, may be determined. Here, any suitable technique or approach, such as capable of finding or estimating position errors on a measurement and/or accounting for effects of geometry of wireless transmitters to a mobile device, for example, may be used, in whole or in part, or otherwise considered. For example, depending on an implementation, to estimate a quality of an initial or "coarse" position fix, HDOP, residual position error, or like techniques may be employed, at least in part. In at least one implementation, a quality of an initial or "coarse" position fix may, for example, be estimated in connection with determining or finding a convex hull formed by locations of wireless transmitters (e.g., access points, etc.) from which passive measurements were obtained, as was indicated. For example, if it is determined that an initial or "coarse" position estimate is not within a convex hull formed by a spatial configuration of wireless transmitters from which passive measurements were obtained, the initial or "coarse" position estimate may not be deemed to be of sufficient quality and, thus, may not be deemed sufficiently reliable and/or accurate. Here, to determine or find such a convex hull, any suitable techniques or approaches, such as, for example, the so-called gift wrapping algorithm, Graham scan, incremental convex hull algorithm, or others may be used, in whole or in part. Similarly, with respect to HDOP and residual position error techniques mentioned above, if a computed residual position error and/or horizontal dilution of precision of locations of these wireless transmitters relative to a first estimated location is indicative of a poor estimate, the initial or "coarse" estimate may not be deemed sufficiently reliable and/or accurate.

Depending on an implementation, a spatial configuration of terrestrial wireless transmitters may, for example, be determined at or by a mobile device, suitable server, or any combination thereof. For example, a spatial configuration of proximate wireless transmitters may be determined, at least in part, by a mobile device via an electronic digital map of an associated indoor or like area that may be provided to the mobile device by a navigation or other server (e.g., positioning assistance server, etc.), such as upon entry of the area, just to illustrate one possible implementation. In some instances, a mobile device may, for example, determine a spatial configuration of proximate wireless transmitters by referencing or accessing a local memory having a database of wireless transmitters for a particular area. Also, at times, a spatial configuration of terrestrial wireless transmitters may, for example, be determined via a server and provided to a mobile device as part of positioning assistance data, such as in response to a message from the mobile device with attributes (e.g., MAC addresses, etc.) of "visible" or proximate wireless transmitters.

Accordingly, in some instances, such as if it is determined that a quality of an initial or "coarse" position fix, such as a first estimated location, for example, is not sufficiently reliable and/or accurate, one or more active measurements may, for example, be initiated. For example, in a particular implementation, a mobile device may initiate an FTM/FTMR message exchange, such as discussed above, to obtain requisite RTT measurements to one or more applicable access points. As was indicated, an access point may have a uniquely assigned MAC address, which may be included in a suitable response message (e.g., an ACK message, etc.), for example. A MAC address may be decoded at or by a mobile device, such as by demodulating an acquired wireless signal, for example, and may be used, at least in part, to obtain an access point's location, among other things. Based, at least in part, on a measured RTT (and an access point's location, etc.), respective ranges to requisite access points may be computed, for example, and an initial or "coarse" location of a mobile device may be updated or refined, such as using one or more appropriate techniques (e.g., trilateration, triangulation, etc.). Thus, here, an updated or refined position fix may, for example, comprise or be representative of a second estimated location, such as a location that may be deemed sufficiently accurate and/or reliable.

In some instances, to obtain a second estimated location (e.g., to refine or update an initial or "coarse" position fix, etc.), a double difference of TOA technique, such as discussed above, may be used, at least in part, such as in addition to or in combination with active positioning. For example, here, a joint non-linear least squares approach or model may be employed, in whole or in part, or otherwise considered, such as via a utilization of both double differences of TOAs obtained from passive scanning and RTT range measurements. In some instances, this joint non-linear least squares approach or model may, for example, be implemented, at least in part, to obtain a second estimated location (e.g., to refine or update an initial or "coarse" position fix, etc.) via one or more iterative techniques or algorithms capable of solving non-linear least squares, such as Newton-Raphson, Levenberg-Marquardt, or the like. These or like iterative algorithms may, for example, be initialized with a coarse position fix. It should be noted that these are merely examples to which claimed subject matter is not limited. As such, in some instances, rather than obtaining a second estimated location via operationally-expensive RTT measurements, which may tax available bandwidth and/or resources, for example, TOA, TDOA, or like passive measurements may be used, at least in part, in combination with one or more RTT measurements. This may, for example, prove beneficial in terms of lowering power and/or bandwidth consumption, improving resource efficiency and/or network scalability, or the like. Thus, in some instances, by combining passive positioning adaptively with active positioning, for example, a mobile device may obtain and/or refine a position fix in a readily adaptable, resource-efficient, and/or scalable manner.

Figure 3:
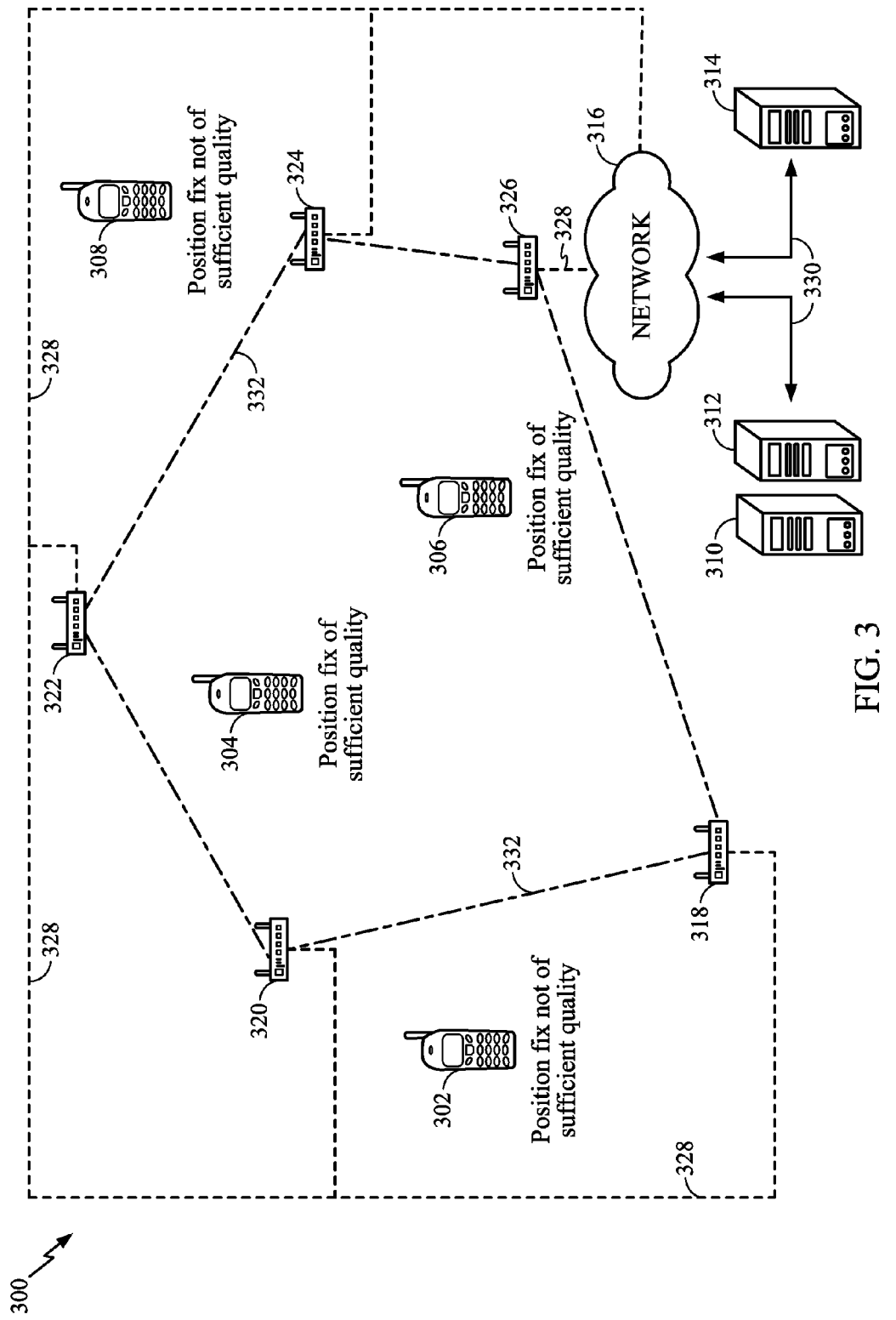
FIG. 3 is a schematic diagram of an implementation of a process illustrating an example use case of enhanced passive positioning with adaptive active positioning.

FIG. 3 is a schematic diagram illustrating an implementation of an example use case or scenario 300 of enhanced passive positioning with adaptive active positioning, such as performed via TOA and RTT measurements, for example, and computing a quality of an initial position estimate via finding a convex hull formed by locations of access points from which TOAs were obtained. For example, as seen, at times, one or more mobile device, such as mobile devices 302, 304, 306, and 308 may be located in an environment in which satellite signals (e.g., signals 104 of FIG. 1) may not be reliably received and/or measured, such as an indoor or like environment, just to illustrate one possible implementation. In some instances, such an environment may, for example, be associated with or include one or more features or aspects of operating environment 100 of FIG. 1. For example, mobile device 302 may correspond to or share common properties with mobile device 102 of FIG. 1, one or more servers 310, 312, and 314 may correspond to or share common properties with one or more servers 116, 118 and 120 of FIG. 1, a network 316 may correspond to or share common properties with network 122 of FIG. 1, wireless transmitters, such as, for example, WLAN access points 318, 320, 322, 324, and 326 may correspond to or share common properties with base station transceiver 108 and/or local transceiver 112 of FIG. 1, or the like. Likewise, here, even though a certain number of devices and/or networks are illustrated, any number of suitable devices and/or networks may be implemented to facilitate or support one or more techniques or processes discussed herein. Also, at times, one or more operations or techniques of example use case or scenario 300 may be performed, at least in part, in an outdoor or like environment, as was indicated.

Here, access points 318, 320, 322, 324 and 326 may all be the same type of device or represent different types of devices, such as WLAN access points, Bluetooth® access points, radio beacons, base transceiver stations, femtocells, GNSS pseudolites, etc. Although not shown, an associated environment may be defined, for example, by a particular indoor or like area (e.g., a shopping mall, office space, etc.) comprising a number of entryways, hallways, cubicles, walls, dividers, staircases, doors, rooms, elevators, or the like. As indicated generally by a dashed line at 328, access points 318, 320, 322, 324 and 326 may be operatively coupled to network 316 that may comprise, for example, one or more wired or wireless communication links capable of making available or providing positioning assistance data to mobile devices 302, 304, 306, and/or 308, as discussed above. As was also indicated, mobile devices 302, 304, 306, and/or 308 may be in communication with one or more access points 318, 320, 322, 324 and/or 326, such as via FTM/FTMR, RTS/CTS, etc. message exchanges, broadcasts of beacon signals by one or more access points 318, 320, 322, 324 and/or 326 to announce their presence in an area, or the like. At times, mobile devices 302, 304, 306, and/or 308 may also communicate with network 316 directly. One or more servers 310, 312, and/or 314 may, for example, communicate with network 316 via communication links 330.

Thus, in operative use, mobile devices 302, 304, 306, and/or 308 may estimate their initial or "coarse" locations, such as via requisite range computations, for example, by "listening" to TOA beacons broadcasted by access points 318, 320, 322, 324 and/or 326 rather than "actively" measuring RTTs, such as via FTM/FTMR, RTS/CTS, etc. message exchanges, as was indicated. As also discussed, in some instances, to compute initial or "coarse" locations of mobile devices 302, 304, 306, and/or 308, a double difference of TOA technique may, for example, be used, at least in part. At times, to implement such a technique, such as with respect to a mobile device 302, for example, TOA beacons may be transmitted from an access point 318 and received at mobile device 302 and an access point 320, which may comprise and/or be designated as a master access point. Likewise, to compute an initial or "coarse" location of a mobile device 304, TOA beacons may be transmitted from an access point 322, for example, and received at mobile device 304 and access point 320. Similar measurements may be performed for mobile devices 306 and 308, for example. Based, at least in part, on obtained measurements and/or timing references communicated by a master access point (e.g., access point 320, etc.), initial or "coarse" locations of mobile devices 302, 304, 306, and 308 may, for example, be estimated, as discussed above. Claimed subject matter is not so limited, of course. For example, at times, initial or "coarse" locations of mobile devices 302, 304, 306, and 308 may be estimated, at least in part, via a GNSS, GNSS pseudolites, input provided by an associated user, radio heat map, proximity to access points 318, 320, 322, 324 and/or 326, dead reckoning, or the like, as was also indicated.

According to an implementation, having obtained initial or "coarse" location estimates of mobile devices 302, 304, 306, and 308, qualities of these estimates may, for example, be determined in some manner. For example, here, qualities of initial or "coarse" location estimates of mobile devices 302, 304, 306, and 308 may be determined, at least in part, in connection with finding a convex hull formed by a spatial configuration of access points 318, 320, 322, 324 and/or 326 (e.g., from which TOAs were obtained, etc.). More specifically, using one or more suitable approaches or techniques (e.g., Graham scan, incremental convex hull algorithm, etc.), a convex hull may, for example, be found to comprise a convex polygon, such as referenced at 332, just to illustrate one possible implementation. Thus, as seen, based, at least in part, on determined convex hull 332, initial or "coarse" location estimates of mobile devices 304 and 306 may be deemed of sufficient quality and, thus, sufficiently reliable and/or accurate, for example, since these estimates are inside of convex hull 332, as was indicated. As such, these initial or "coarse" location estimates may correspond to and/or be used as actual positions of mobile devices 304 and 306, for example, meaning that, with respect to these mobile devices, initiating active measurements may not be needed or otherwise useful.

With respect to mobile devices 302 and 308, however, active measurements may, for example, be initiated since, as seen, initial or "coarse" location estimates for these mobile devices are outside of convex hull 332, meaning that such location estimates may not be deemed of sufficient quality and, thus, not sufficiently reliable and/or accurate. Thus, here, mobile devices 302 and 308 may, for example, initiate IEEE std. 802.11v FTM/FTMR message exchanges and may measure respective signal RTTs of applicable FTM/FTMR frames. Based, at least in part, on measured RTTs, respective ranges may be computed, for example, and initial or "coarse" locations of mobile devices 302 and 308 may be updated or refined, such as using one or more appropriate techniques (e.g., trilateration, triangulation, etc.). As was also discussed, in some instances, initial or "coarse" locations of mobile devices 302 and 308 may, for example, be updated or refined based, at least in part, on a double difference of TOA technique in combination with RTT measurements. As such, one or more operations and/or techniques for enhanced passive positioning with adaptive active positioning, such as discussed herein, may lower power and/or bandwidth consumption, improving resource efficiency and/or network scalability, or the like.

Figure 4:
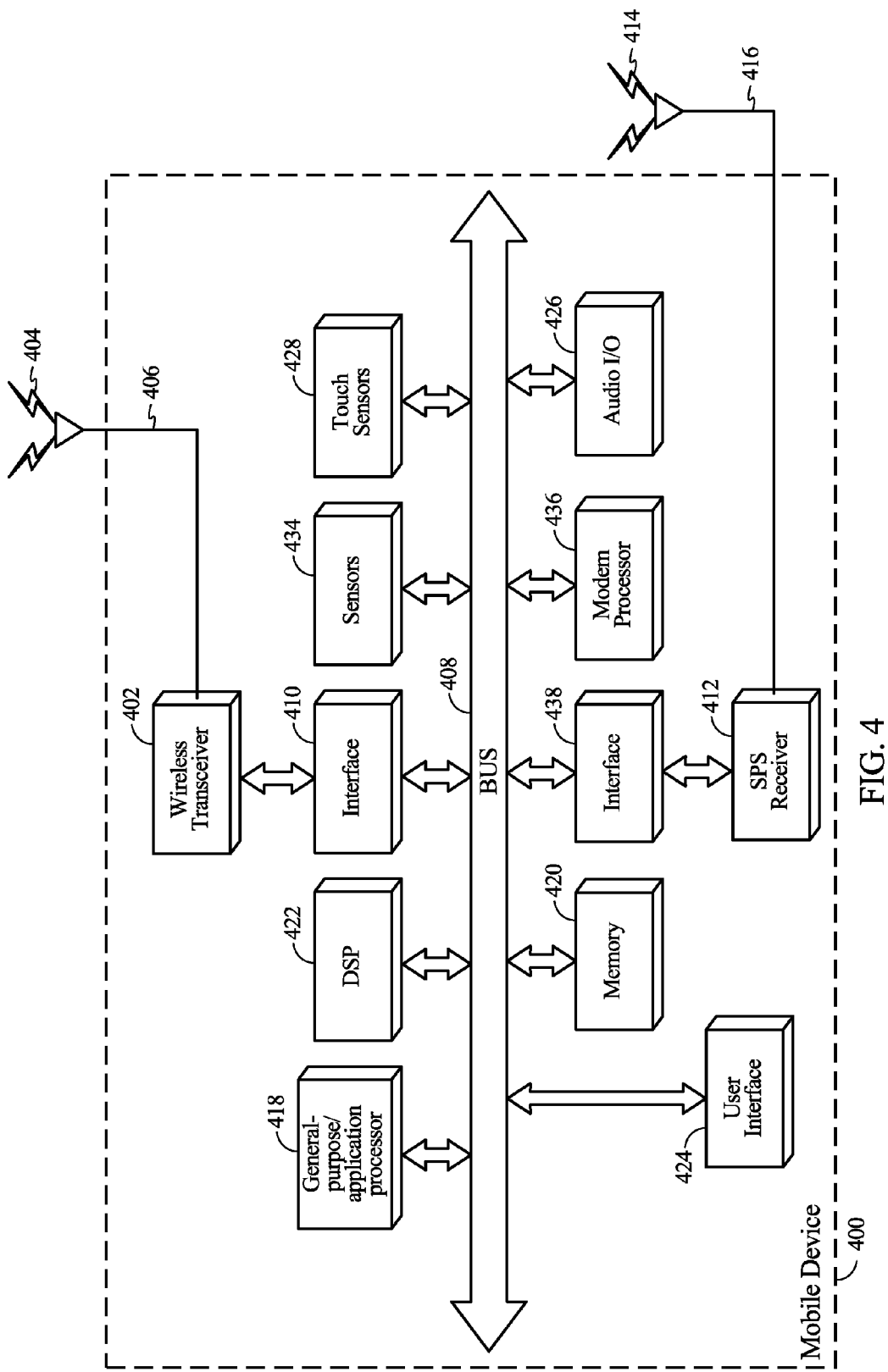
FIG. 4 is a schematic diagram illustrating an implementation of an example computing environment associated with a mobile device.

FIG. 4 is a schematic diagram of an implementation of an example computing environment associated with a mobile device that may be used, at least in part, to facilitate or support one or more operations and/or techniques for enhanced passive positioning with adaptive active positioning. An example computing environment may comprise, for example, a mobile device 400 that may include one or more features or aspects of mobile device 102 of FIG. 1, mobile devices 302, 304, 306, and/or 308 of FIG. 3, though claimed subject matter is not so limited. For example, in some instances, mobile device 400 may comprise a wireless transceiver 402 capable of transmitting and/or receiving wireless signals, referenced generally at 404, such as via an antenna 406 over a suitable wireless communications network. Wireless transceiver 402 may, for example, be capable of sending or receiving one or more suitable communications, such as one or more communications discussed with reference to FIGS. 1-3. Wireless transceiver 402 may, for example, be coupled or connected to a bus 408 via a wireless transceiver bus interface 410. Depending on an implementation, at times, wireless transceiver bus interface 410 may, for example, be at least partially integrated with wireless transceiver 402. Some implementations may include multiple wireless transceivers 402 or antennas 406 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 400 may, for example, comprise an SPS or like receiver 412 capable of receiving or acquiring one or more SPS or other suitable wireless signals 414, such as via an SPS or like antenna 416. SPS receiver 412 may process, in whole or in part, one or more acquired SPS signals 414 for estimating a location of mobile device 400, initial or otherwise. In some instances, one or more general-purpose/application processors 418 (henceforth referred to as "processor"), memory 420, digital signal processor(s) (DSP) 422, or like specialized devices or processors not shown may be utilized to process acquired SPS signals 414, in whole or in part, calculate a location of mobile device 400, such as in conjunction with SPS receiver 412, or the like. Storage of SPS or other signals for implementing one or more positioning operations, such as in connection with one or more techniques for enhanced passive positioning with adaptive active positioning, for example, may be performed, at least in part, in memory 420, suitable registers or buffers (not shown). It should be appreciated that in at least one implementation one or more processors 418 may comprise one or more location processing modules capable of obtaining a first estimated location of mobile device 400 based, at least in part, on the passive measurements and in absence of active measurements; and initiating the active measurements for obtaining a second estimated location of mobile device 400 in response to determining that the first estimated location is not of sufficient quality based, at least in part, on the first estimated location and a spatial configuration of the terrestrial transmitters. In certain implementations, another processor, such as DSP 422, for example, may comprise a separate processing module that may be utilized, at least in part, to initiate active measurements, such as via processing and/or communicating one or more digital signals representative of the active measurements, for example, to obtain a second estimated location of mobile device 400 in response to a determination that the first estimated location is not of sufficient quality based, at least in part, on the first estimated location and a spatial configuration of the terrestrial transmitters.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 418 or DSP 422 may include one or more processors, controllers, microprocessors, microcontrollers, application specific integrated circuits, digital signal processors, programmable logic devices, field programmable gate arrays, central processing units, graphics processor units, or the like, or any combination thereof. Thus, at times, processor 418 or DSP 422 or any combination thereof may comprise or be representative of means for obtaining passive measurements of signals transmitted from terrestrial transmitters, such as to implement operation 202 of FIG. 2, at least in part. In addition, in at least one implementation, processor 418 or DSP 422 may be representative of or comprise, for example, means for obtaining a first estimated location of mobile device 400 based, at least in part, on the passive measurements and in absence of active measurements, such as to implement operation 204 of FIG. 2, at least in part. Also, at times, processor 418 or DSP 422 may comprise, for example, or be representative of means for initiating the active measurements for obtaining a second estimated location of mobile device 400 in response to determining that the first estimated location is not of sufficient quality based, at least in part, on the first estimated location and a spatial configuration of the terrestrial transmitters, as illustrated in or described with respect to operation 206 of FIG. 2, for example.

As illustrated, DSP 422 may be coupled or connected to processor 418 and memory 420 via bus 408. Although not shown, in some instances, bus 408 may comprise one or more bus interfaces that may be integrated with one or more applicable components of mobile device 400, such as DSP 422, processor 418, memory 420, or the like. In various embodiments, one or more operations or functions described herein may be performed in response to execution of one or more machine-readable instructions stored in memory 420, such as on a computer-readable storage medium, such as RAM, ROM, FLASH, disc drive, etc., just to name a few examples. Instructions may, for example, be executable via processor 418, one or more specialized processors not shown, DSP 422, or the like. Memory 420 may comprise a non-transitory processor-readable memory, computer-readable memory, etc. that may store software code (e.g., programming code, instructions, etc.) that may be executable by processor 418, DSP 422, or the like to perform operations or functions described herein.

Mobile device 400 may comprise a user interface 424, which may include any one of several devices such as, for example, a speaker, microphone, display device, vibration device, keyboard, touch screen, etc., just to name a few examples. In at least one implementation, user interface 424 may enable a user to interact with one or more applications hosted on mobile device 400. For example, one or more devices of user interface 424 may store analog or digital signals on memory 420 to be further processed by DSP 422, processor 418, etc. in response to input or action from a user. Similarly, one or more applications hosted on mobile device 400 may store analog or digital signals in memory 420 to present an output signal to a user. In some implementations, mobile device 400 may optionally include a dedicated audio input/output (I/O) device 426 comprising, for example, a dedicated speaker, microphone, digital to analog circuitry, analog to digital circuitry, amplifiers, gain control, or the like. It should be understood, however, that this is merely an example of how audio I/O device 426 may be implemented, and that claimed subject matter is not limited in this respect. As seen, mobile device 400 may comprise one or more touch sensors 428 responsive to touching or like pressure applied on a keyboard, touch screen, or the like.

Mobile device 400 may comprise one or more sensors 434 coupled or connected to bus 408, such as, for example, one or more inertial sensors, ambient environment sensors, or the like. Inertial sensors of sensors 434 may comprise, for example, one or more accelerometers (e.g., collectively responding to acceleration of mobile device 400 in one, two, or three dimensions, etc.), gyroscopes or magnetometers (e.g., to support one or more compass or like applications, etc.), etc., just to illustrate a few examples. Ambient environment sensors of mobile device 400 may comprise, for example, one or more barometric pressure sensors, temperature sensors, ambient light detectors, camera sensors, microphones, etc., just to name few examples. Sensors 434 may generate analog or digital signals that may be stored in memory 420 and may be processed by DSP 422, processor 418, etc., such as in support of one or more applications directed to positioning or navigation operations, wireless communications, radio heat map learning, video gaming or the like.

In a particular implementation, mobile device 400 may comprise, for example, a modem processor 436, dedicated or otherwise, capable of performing baseband processing of signals received or downconverted via wireless transceiver 402, SPS receiver 412, or the like. Similarly, modem processor 436 may perform baseband processing of signals to be upconverted for transmission via wireless transceiver 402, for example. In alternative implementations, instead of having a dedicated modem processor, baseband processing may be performed, at least in part, by processor 418, DSP 422, or the like. In addition, in some instances, an interface 438, although illustrated as a separate component, may be integrated, in whole or in part, with one or more applicable components of mobile device 400, such as bus 408 or SPS receiver 412, for example. Optionally or alternatively, SPS receiver 412 may be coupled or connected to bus 408 directly. It should be understood, however, that these are merely examples of components or structures that may perform baseband processing, and that claimed subject matter is not limited in this regard.

Figure 5:
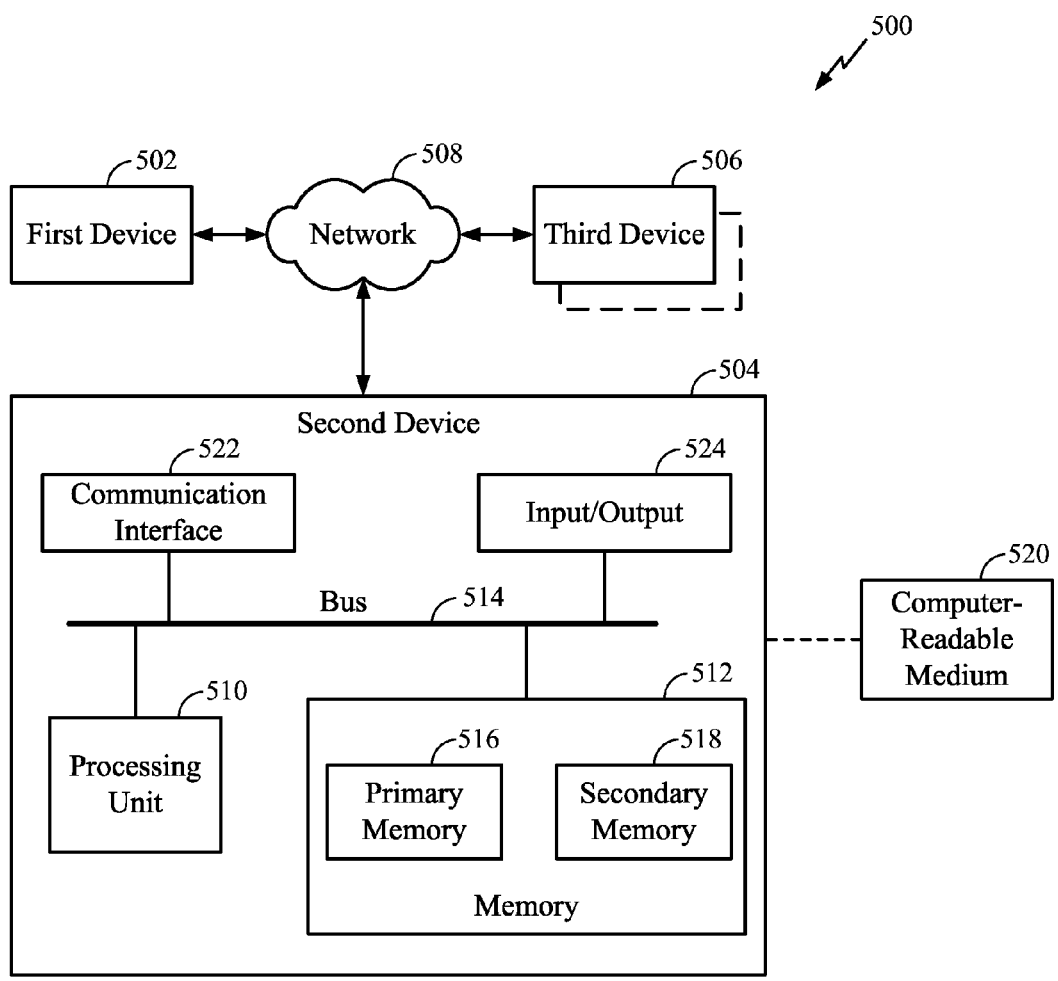
FIG. 5 is a schematic diagram illustrating an implementation of an example computing environment associated with a server.

FIG. 5 is a schematic diagram illustrating an implementation of an example computing environment or system 500 that may be associated with or include one or more servers or other devices capable of partially or substantially implementing or supporting one or more operations and/or techniques for enhanced passive positioning with adaptive active positioning, such as discussed above in connection with FIGS. 1-3, for example. Computing environment 500 may include, for example, a first device 502, a second device 504, a third device 506, etc., which may be operatively coupled together via a communications network 508. In some instances, first device 502 may comprise a server capable of providing positioning assistance parameters, such as, for example, identities, locations, etc. of known wireless transmitters, radio heat map, base station almanac, electronic digital map, database of wireless transmitters, bias estimates, signal measurements, or the like. For example, first device 502 may also comprise a server capable of providing an electronic digital map to a mobile device based, at least in part, on a coarse or rough estimate of a location of the mobile device, upon request, or the like. First device 502 may also comprise a server capable of providing any other suitable positioning assistance parameters (e.g., an electronic digital map, radio heat map, etc.), relevant to a location of a mobile device. Second device 504 or third device 506 may comprise, for example, mobile devices, though claimed subject matter is not so limited. For example, in some instances, second device 504 may comprise a server functionally or structurally similar to first device 502, just to illustrate another possible implementation. In addition, communications network 508 may comprise, for example, one or more wireless transmitters, such as access points, femtocells, or the like. Of course, claimed subject matter is not limited in scope in these respects.

First device 502, second device 504, or third device 506 may be representative of any device, appliance, platform, or machine that may be capable of exchanging parameters and/or information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to communications network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix of a suitable mobile device, such as in an area of interest, for example, based, at least in part, on one or more received or acquired wireless signals, such as from an SPS, one or more WLAN access points, etc. In some implementations, a location-tracking unit may be at least partially integrated with a suitable processing unit, such as processing unit 510, for example, though claimed subject matter is not so limited. In certain server-based or server-supported implementations, processing unit 510 may, for example, comprise means for obtaining passive measurements of signals transmitted from terrestrial transmitters, such as to facilitate or support operations 202, 204, and/or 206 of FIG. 2, at least in part. In some instances, processing unit 510 may, for example, comprise means for obtaining a first estimated location of a mobile device based, at least in part, on the passive measurements and in absence of active measurements, such as to facilitate or support operations 202, 204, and/or 206 of FIG. 2, at least in part. Depending on an implementation, processing unit 510 may also comprise, for example, means for initiating the active measurements for obtaining a second estimated location of the mobile device in response to determining that the first estimated location is not of sufficient quality based, at least in part, on the first estimated location and a spatial configuration of the terrestrial transmitters, such as to facilitate or support operations 202, 204, and/or 206 of FIG. 2, at least in part.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a machine-readable medium, storage medium, or the like.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at mobile device, comprising:
obtaining passive measurements of signals transmitted from terrestrial transmitters;
obtaining a first estimated location of said mobile device based, at least in part, on said passive measurements; and
deferring initiating active measurements for said terrestrial transmitters for obtaining a second estimated location of said mobile device until a determination that said first estimated location is not of sufficient quality based, at least in part, on said first estimated location and a spatial configuration of said terrestrial transmitters.

2. The method of claim 1, wherein said determining that said first estimated location is not of sufficient quality is further based, at least in part, on determining whether said first estimated location is inside or outside of a convex hull formed by locations of said terrestrial transmitters.

3. The method of claim 1, wherein said determining that said first estimated location is not of sufficient quality is further based, at least in part, on a horizontal dilution of precision (HDOP) computed based, at least in part, on locations of said terrestrial transmitters.

4. The method of claim 1, wherein said determining that said first estimated location is not of sufficient quality is further based, at least in part, on a residual position error computed based, at least in part, on locations of said terrestrial transmitters.

5. The method of claim 1, wherein said passive measurements comprise at least one of the following: time of arrival (TOA) measurements; time difference of arrival (TDOA) measurements; received signal strength indicator (RSSI) measurements; angle of arrival (AOA) measurements; signal-related measurements communicated via a positioning assistance message; or any combination thereof.

6. The method of claim 1, wherein said active measurements comprise round trip time (RTT) measurements.

7. The method of claim 1, wherein said active measurements are initiated via at least one of the following: an FTM/FTMR message exchange; or an RTS/CTS message exchange.

8. The method of claim 1, wherein said terrestrial transmitters comprise at least one or the following: one or more WLAN access points; one or more base transceiver stations; one or more femtocells; one or more radio beacons; one or more mobile devices with known locations; or any combination thereof.

9. The method of claim 1, wherein said first estimated location comprises an initial or "coarse" location of said mobile device obtained via at least one of the following: a double difference of TOA technique; a Global Navigation Satellite System (GNSS); a GNSS pseudolite; input provided by an associated user; a radio heat map; a proximity to said terrestrial transmitters; dead reckoning; or any combination thereof.

10. The method of claim 1, wherein said second estimated location is obtained via updating or refining said first estimated location via at least one of the following: RTT measurements; TOA measurements of a double difference of TOA technique; or any combination thereof.

11. The method of claim 1, wherein said terrestrial transmitters are associated with an indoor environment.

12. An apparatus comprising:
means for obtaining passive measurements of signals transmitted from terrestrial transmitters;
means for obtaining a first estimated location of a mobile device based, at least in part, on said passive measurements; and
means for deferring initiating active measurements for said terrestrial transmitters for obtaining a second estimated location of said mobile device until a determination that said first estimated location is not of sufficient quality based, at least in part, on said first estimated location and a spatial configuration of said terrestrial transmitters.

13. The apparatus of claim 12, and further comprising means for determining that said first estimated location is not of sufficient quality based, at least in part, on whether said first estimated location is inside or outside of a convex hull formed by locations of said terrestrial transmitters.

14. The apparatus of claim 12, and further comprising means for determining that said first estimated location is not of sufficient quality based, at least in part, on a horizontal dilution of precision (HDOP) computed based, at least in part, on locations of said terrestrial transmitters.

15. The apparatus of claim 12, and further comprising means for determining that said first estimated location is not of sufficient quality based, at least in part, on a residual position error computed based, at least in part, on locations of said terrestrial transmitters.

16. The apparatus of claim 12, wherein said passive measurements comprise at least one of the following: time of arrival (TOA) measurements; time difference of arrival (TDOA) measurements; received signal strength indicator (RSSI) measurements; angle of arrival (AOA) measurements; signal-related measurements communicated via a positioning assistance message; or any combination thereof.

17. The apparatus of claim 12, wherein said active measurements comprise round trip time (RTT) measurements.

18. The apparatus of claim 12, wherein said active measurements are initiated via at least one of the following: an FTM/FTMR message exchange; or an RTS/CTS message exchange.

19. The apparatus of claim 12, wherein said terrestrial transmitters comprise at least one or the following: one or more WLAN access points; one or more base transceiver stations; one or more femtocells; one or more radio beacons; one or more mobile devices with known locations; or any combination thereof.

20. The apparatus of claim 12, wherein said first estimated location comprises an initial or "coarse" location of said mobile device obtained via at least one of the following: a double difference of TOA technique; a Global Navigation Satellite System (GNSS); a GNSS pseudolite; input provided by an associated user; a radio heat map; a proximity to said terrestrial transmitters; dead reckoning; or any combination thereof.

21. The apparatus of claim 12, wherein said second estimated location is obtained via updating or refining said first estimated location via at least one of the following: RTT measurements; TOA measurements of a double difference of TOA technique; or any combination thereof.

22. An apparatus comprising:
a mobile device comprising:
a wireless transceiver to communicate with an electronic communications network to:
obtain passive measurements of signals transmitted from terrestrial transmitters; and
one or more processors coupled to a memory to:
obtain a first estimated location of said mobile device based, at least in part, on said passive measurements; and defer initiation of active measurements for said terrestrial transmitters to obtain a second estimated location of said mobile device until a determination that said first estimated location is not of sufficient quality based, at least in part, on said first estimated location and a spatial configuration of said terrestrial transmitters.

23. The apparatus of claim 22, wherein said one or more processors further to determine that said first estimated location is not of sufficient quality based, at least in part, on a determination whether said first estimated location is inside or outside of a convex hull formed by locations of said terrestrial transmitters.

24. The apparatus of claim 22, wherein said passive measurements comprise at least one of the following: time of arrival (TOA) measurements; time difference of arrival (TDOA) measurements; received signal strength indicator (RSSI) measurements; angle of arrival (AOA) measurements; signal-related measurements communicated via a positioning assistance message; or any combination thereof.

25. The apparatus of claim 22, wherein said active measurements comprise round trip time (RTT) measurements.

26. The apparatus of claim 22, wherein said terrestrial transmitters comprise at least one or the following: one or more WLAN access points; one or more base transceiver stations; one or more femtocells; one or more radio beacons; one or more mobile devices with known locations; or any combination thereof.

27. The apparatus of claim 22, wherein said first estimated location comprises an initial or "coarse" location of said mobile device obtained via at least one of the following: a double difference of TOA technique; a Global Navigation Satellite System (GNSS); a GNSS pseudolite; input provided by an associated user; a radio heat map; a proximity to said terrestrial transmitters; dead reckoning; or any combination thereof.

28. The apparatus of claim 22, wherein said one or more processors further to obtain said second estimated location via an update or refinement of said first estimated location via at least one of the following: RTT measurements; TOA measurements of a double difference of TOA technique; or any combination thereof.

29. An article comprising:
a non-transitory storage medium having instructions executable by a processor to:
obtain passive measurements of signals transmitted from terrestrial transmitters;
obtain a first estimated location of a mobile device based, at least in part, on said passive measurements; and
defer initiation of active measurements for said terrestrial transmitters to obtain a second estimated location of said mobile device until a determination that said first estimated location is not of sufficient quality based, at least in part, on said first estimated location and a spatial configuration of said terrestrial transmitters.

30. The article of claim 29, wherein said storage medium further comprises instructions to determine that said first estimated location is not of sufficient quality based, at least in part, on a determination whether said first estimated location is inside or outside of a convex hull formed by locations of said terrestrial transmitters.

* * * * *